(12) United States Patent
Chiu

(10) Patent No.: US 6,382,558 B1
(45) Date of Patent: *May 7, 2002

(54) SAFETY SYSTEM FOR A HELICOPTER

(76) Inventor: Chui-Wen Chiu, 9 Nordic Place, North York, Toronto, Ontario (CA), M3A 2H8

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/585,482

(22) Filed: Jun. 2, 2000

(51) Int. Cl.[7] .............................................. B64C 25/00
(52) U.S. Cl. .................. 244/17.15; 244/139; 244/17.11
(58) Field of Search .......................... 244/17.15, 6, 7 R, 244/7 A, 17.11, 17.25, 138 R, 139

(56) References Cited

U.S. PATENT DOCUMENTS

| | | | | |
|---|---|---|---|---|
| 1,823,799 A | * | 9/1931 | Friedrich | |
| 2,653,779 A | * | 9/1953 | Terry | |
| 2,812,147 A | * | 11/1957 | Trabucco | |
| 3,138,348 A | * | 6/1964 | Stahmer | |
| 3,384,327 A | * | 5/1968 | Postelson-Apostolescu | |
| 3,745,707 A | * | 7/1973 | Herr | |
| 4,298,177 A | * | 11/1981 | Berlongieri | |
| 4,676,457 A | * | 6/1987 | Allen | |
| 4,824,188 A | * | 4/1989 | Hatch | |
| 5,779,515 A | * | 7/1998 | Chung | |
| 5,823,458 A | * | 10/1998 | Huang | |
| 6,095,251 A | * | 8/2000 | Mitchell et al. | |

* cited by examiner

Primary Examiner—Charles T. Jordan
Assistant Examiner—T. Dinh

(57) ABSTRACT

A safety system is provided on a helicopter by mounting a parachute within a cylinder located in a hollow drive shaft of the propeller or in an external container. Four auxiliary parachutes are located in front and behind, and to the left and right of the propeller. The propeller may be locked in a predetermined angular position by a braking system of the drive shaft when the helicopter is disabled in an air accident such that the auxiliary parachutes are located in the spaces between the propeller blades for their safe deployment for suspending the helicopter in air. Speed reducing jets are provided for reducing the falling speed of the helicopter and for landing it safely on the ground. Inflatable bags are provided for maintaining the helicopter afloat when it falls on to a body of water or to cushion its landing impact on the ground.

6 Claims, 10 Drawing Sheets

SAFETY SYSTEM FOR A HELICOPTER

FIELD OF THE INVENTION

This invention relates to helicopters and more particularly relates to helicopters having emergency provisions for landing safely onto the ground in the event it is disabled in an air accident.

BACKGROUND OF THE INVENTION

The capability of a helicopter in lifting off vertically from the ground and traveling horizontally over a long distance and then landing vertically again at the destination has greatly changed the traditional concept of having to provide a runway for an air plane to take off and to land. This concept is ideal in air transportation. Only a relatively much smaller ground area is required for the helicopter to take off or land. Thus, air transportation may be achieved quickly in any emergency; for example, in the transportation of patients, rescuing lives in a flood disaster, fire fighting in a forest area not accessible to land vehicles, in engineering and military operations.

Helicopter is an air traveling means which meets all transportation requirements. It is a product of much study and constant improvements and it is utilized for a great variety of air operations throughout the world. However, when an accident occurs in which a disabled helicopter weighing several tons including its passengers would imminently fall to the ground resulting in a total fatality. The reason for such disaster is that human is unable to build an infallible helicopter. The present invention provides the means which may be incorporated in a helicopter for safely landing it back on the ground when it accidentally becomes disabled. People regard the helicopter as a mere half developed product, because it has no provision of resolving such severe problem of safety in the event of an accident when the helicopter is flying high in the sky. If such problem can be resolved, it would fulfill the hope of achieving a safe flying machine which could safeguard the lives of the passengers, so that people would have total confidence in this form of safe transportation.

When trouble occurs in either the engine, electrical power, the body structure or loss of control by the pilot, during flight of the helicopter, in order to protect its passengers and the goods being transported, the simplest method is by using parachutes to support the helicopter for landing it safely back onto the ground. The parachutes would suspend the body of the helicopter in such event to reduce its falling speed. The main problem of such concept is that the large propeller of a helicopter covers over a large portion of the helicopter and it is not feasible to deploy a parachute directly over the helicopter since the parachute would readily be severed by the propeller.

Furthermore, use of parachutes alone can not reduce the falling speed of a disabled helicopter to obtain a safe landing on the ground, and provisions must be incorporated to protect the helicopter if it falls onto a body of water such as in the sea, a lake, or a river.

SUMMARY OF THE INVENTION

It is an object of the present invention to provide a parachute system on a helicopter, which is deployable for suspending it in air if the helicopter is disabled.

It is another object of the present invention to provide a braking system on a helicopter for retaining its propeller at a predetermined position while the parachute is being deployed.

It is another object of the present invention to provide a plurality of speed reduction jets on a helicopter for reducing its falling speed and for landing it safely back onto the ground.

It is another object of the present invention to provide a cutting means for severing the parachute after the helicopter has landed on the ground.

It is yet another object of the present invention to provide an inflatable air bag system which is operative to maintain the helicopter afloat if it lands on a body of water.

It is still another object of the present invention to provide a sealing means for preventing water from entering the helicopter when it has landed on a body of water.

DETAILED DESCRIPTION OF THE PREFERRED EMBODIMENTS

Figure 1:
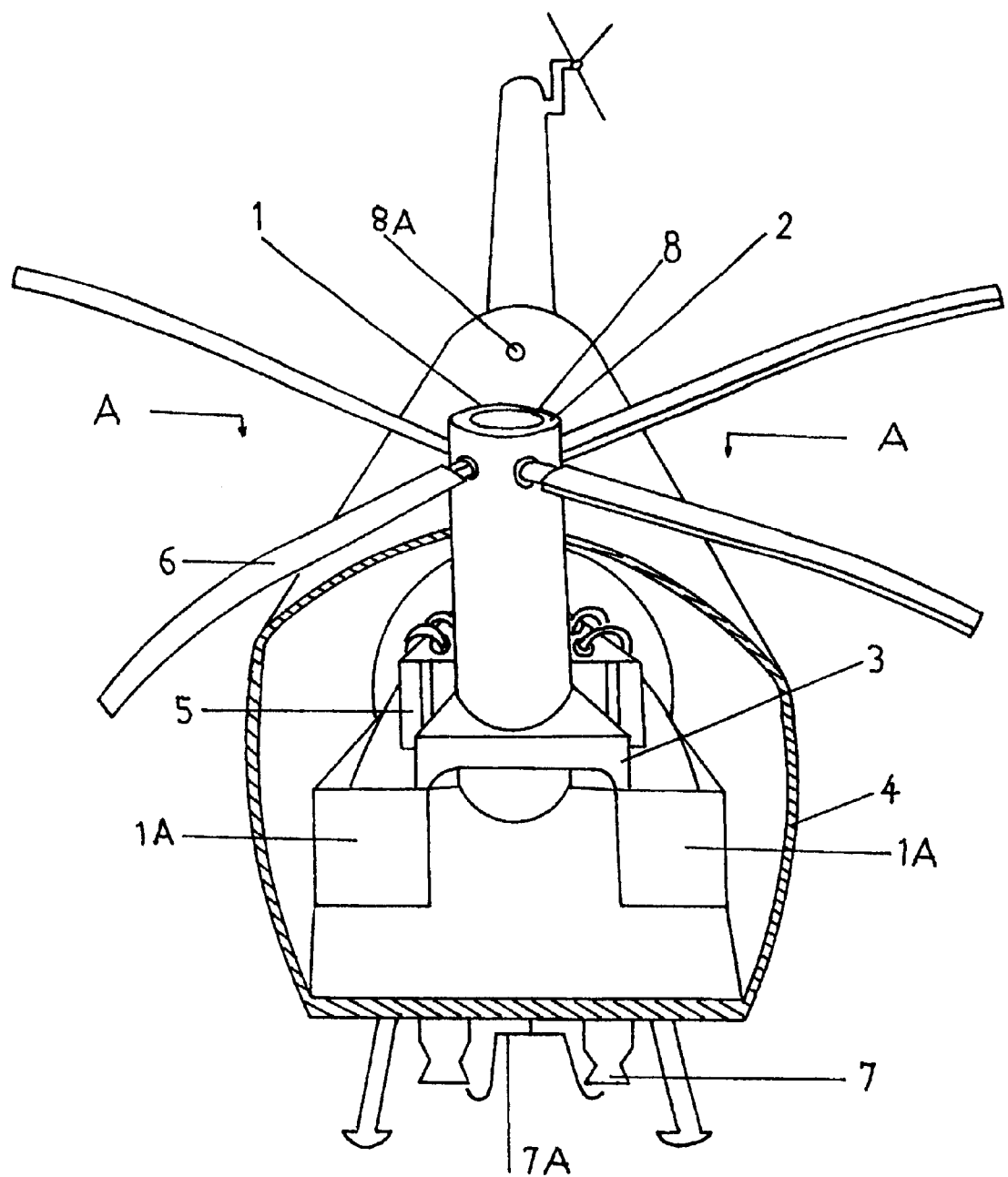
FIG. 1 is a cross sectional front view of the helicopter.
Figure 2:
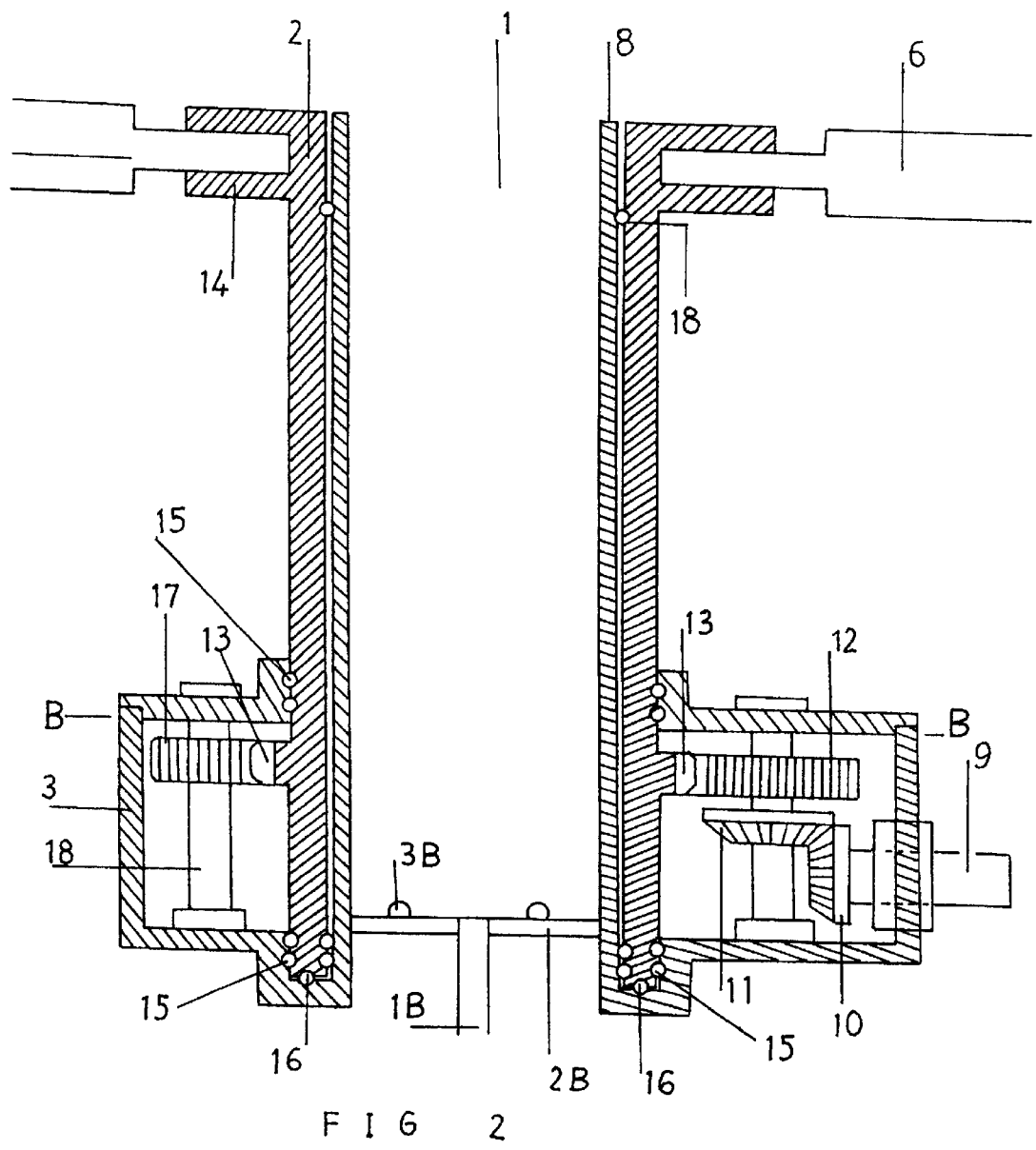
FIG. 2 is an isolated sectional partial front view of the hollow propeller shaft of the helicopter along section line A—A in FIG. 1, according to the present invention for storing the parachute and in which the air tube is located.
Figure 3:
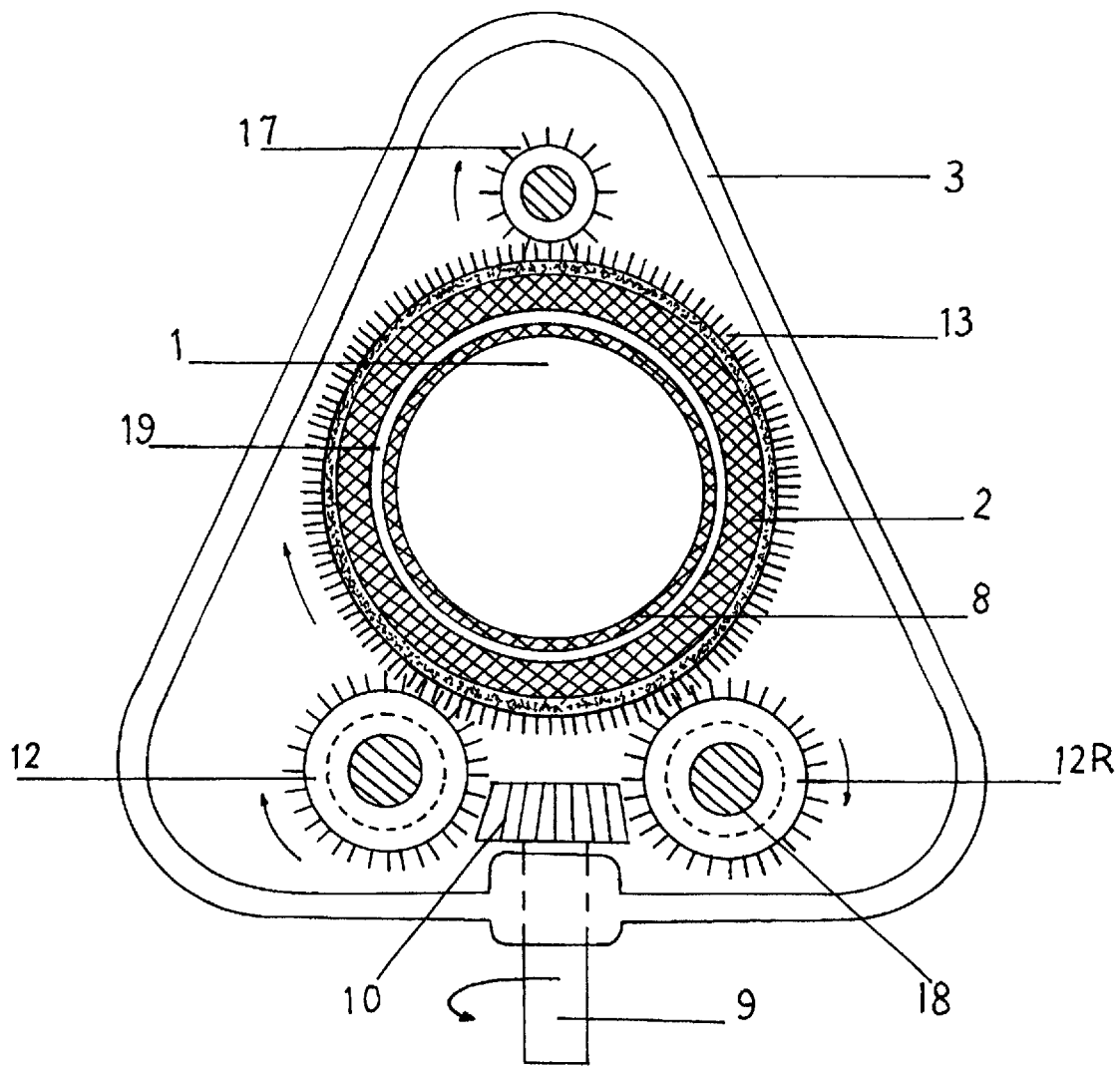
FIG. 3 is an isolated sectional top view along section line B—B of FIG. 2.

With reference to the drawings, the helicopter of the present invention is provided with a hollow center 1 is its propeller shaft 2. The drive gears for the shaft 2 are located in a gear box 3 which is filled with lubricating oil. The gear box and the rotating shaft 2 are located in a body portion 4 adjacent to the engine 5 of the helicopter. The propeller 6 is mounted on the top of the large hollow steel rotating shaft 2. A plurality of speed reducing jets 7 are installed at the belly portion of the helicopter, and they are operative for reducing the falling speed to a safe rate when the helicopter is close to the ground so as to obtain a safe landing. The duration of the ignition of the jets may be predetermined such that their fuel would be depleted to extinguish their ignition when the helicopter touches the ground so that they would not cause any fire hazard to the helicopter. Additionally, fire extinguishing means 7A is provided, which may be operated to extinguish any residual ignition of the speed reducing jets 7 or due to any other causes after the helicopter has landed on the ground.

A non-rotatable and not weight bearing tube 8 is provided within the main hollow steel rotating shaft 2. The hollow center 1 of the tube 8 provides the chamber for housing the main parachute.

Air ventilation with the outside atmosphere is provided by a telescopic fresh air ventilation tube 8A located at the top of the helicopter body. The fresh air ventilation tube 8A may be raised or lowered similar to a periscope of a submarine. The ventilation tube 8A may be extended above the waves, when the helicopter lands on a body of water, for conducting fresh air supply to the passengers located inside the helicopter. Closure traps are provided at the engine exhaust and air conditioning vent to prevent water from entering into the helicopter through these ports.

A power drive shaft 9 is coupled to the engine through a high speed gear box having various coupling gears 10, 11, 12, 12R, 13, and 17. The gear 13 is mounted on the rotating shaft, and the gear 17 is a horizontal rotating gear mounted on a vertical shaft 18.

The tube 8 has a closed bottom except for an air opening 1B through which high pressure compressed air may be released into the tube 8 to eject a small parachute which upon deployment will, in turn, pull the main parachute outwards from the helicopter for its deployment. The air opening 1B may be eliminated if a very large parachute is required for suspending a heavy helicopter, in such event, the parachute may be located within the helicopter body, and it may be deployed using a small parachute as described above.

A coupling 14 is provided at the top end of the rotating shaft 2 for mounting the propeller 6. The rotation of the propeller is provided by the drive gear 13 which is supported by bearings 16 and 18. Sealing O-rings are provided at circular grooves 15 formed on the propeller shaft 2.

Chambers 1A are provided for housing the elongated inflatable air bags which may be inflated by high pressure compressed air from air cylinders for maintaining the helicopter afloat when the helicopter falls onto water so as to await for rescue. A tubular gasket is provided between the exit door and the door frame. The tubular gasket may be inflated either by automatic or manual inflation means to provide a leak-proof joint between the door and the door frame such that no water may leak through the joint into the interior cabin of the helicopter. Two elongated inflatable air bags are mounted on both sides of the helicopter such that when they are inflated they would maintain the helicopter floating on water in a stable manner.

The hollow tube 8 for housing the main parachute has a circular fixed bottom 2B, and the parachute is mounted to the helicopter by mounting rings 3B.

The propeller 6 of the helicopter may be held stationary at a predetermined position by a braking system as shown in FIGS. 4, 5, 6 and 7, so as to provide safe spaces required to deploy the parachutes above the helicopter. The special braking system is designed to retain and lock the propeller blades at the same predetermined stationary positions over the helicopter body 19.

Figure 4:
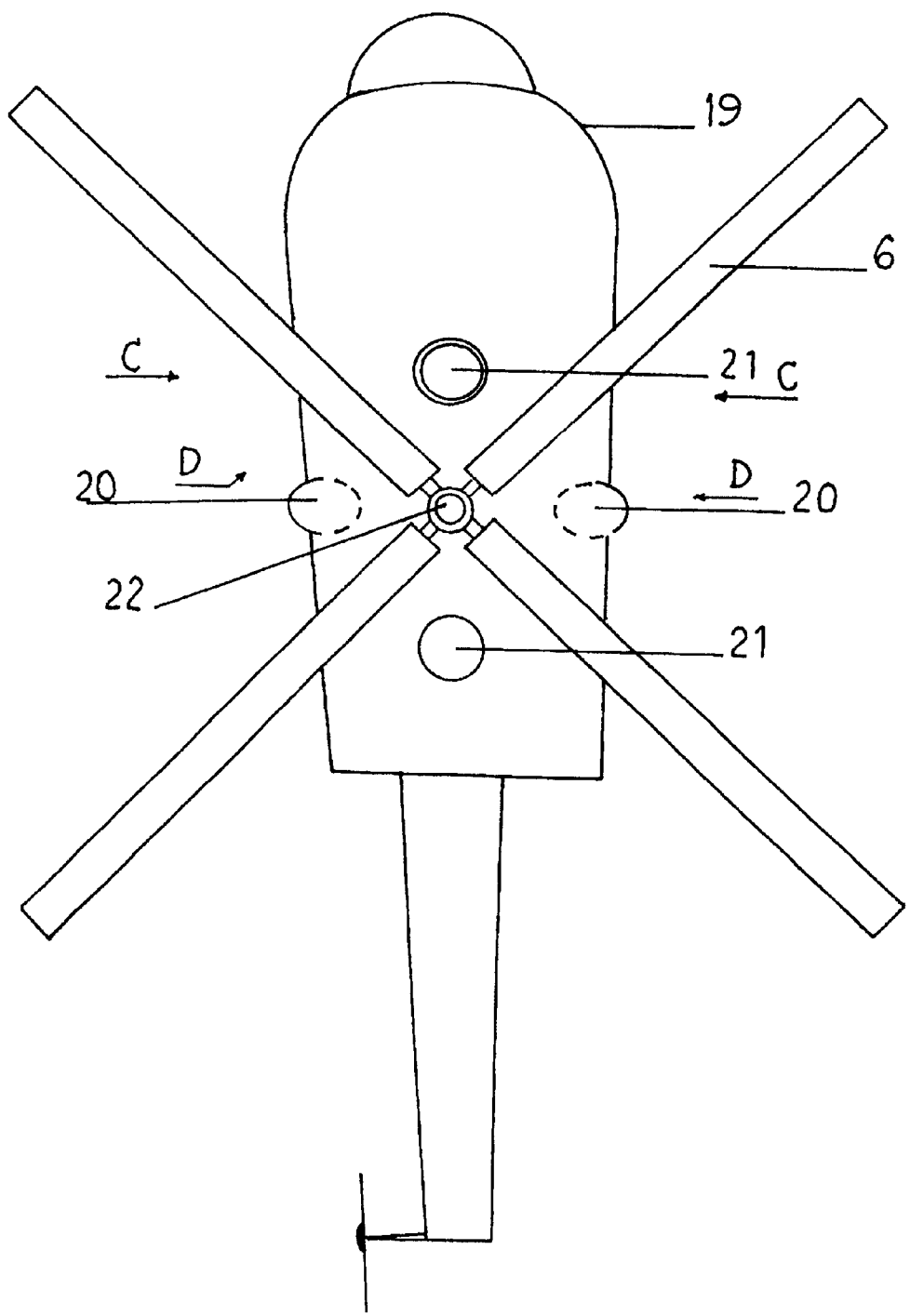
FIG. 4 is a top elevation view of the helicopter showing locations on the left and right sides of the body for mounting the parachutes 20.
Figure 5:
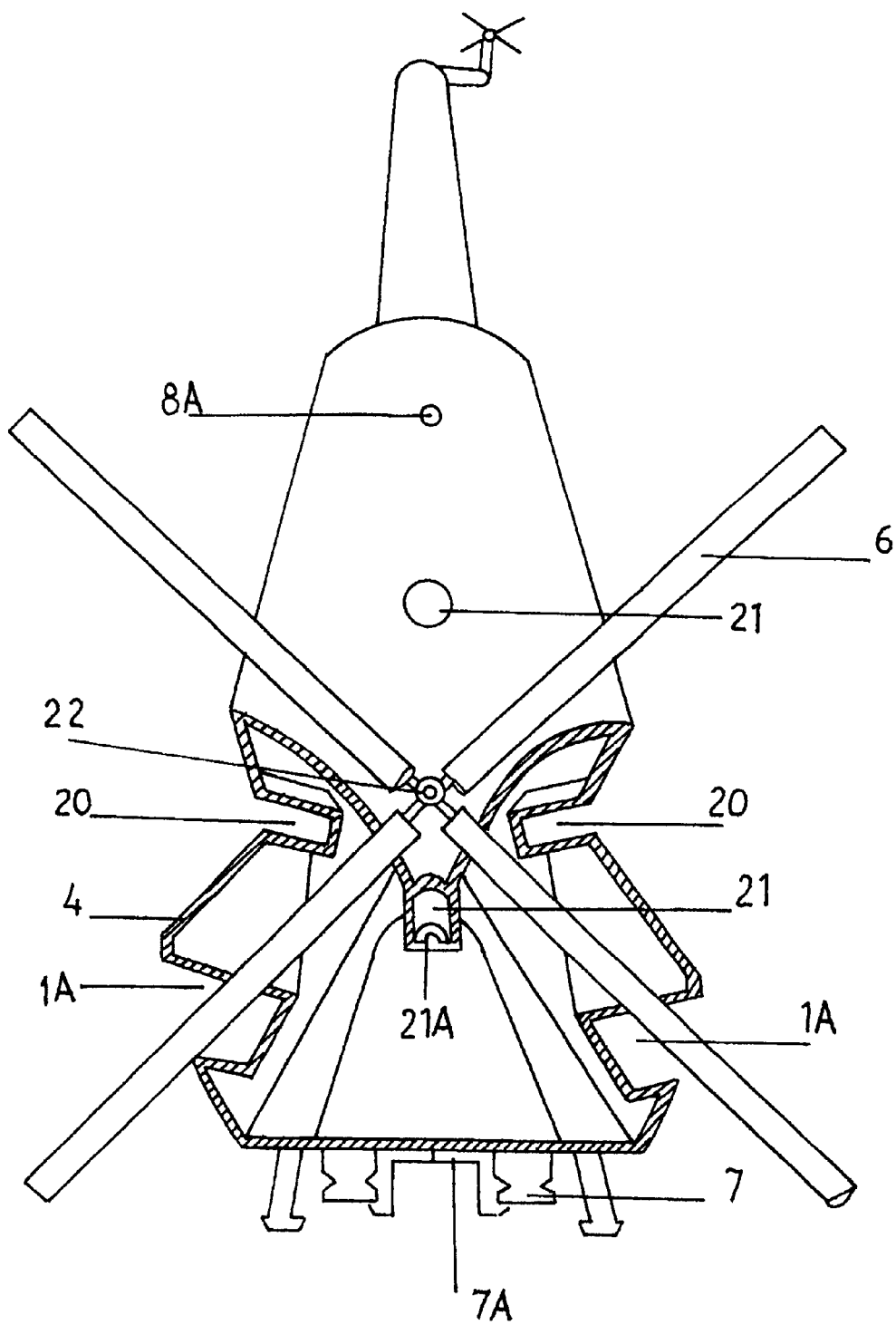
FIG. 5 is a top partial cut view extending from section line C—C to section line D—D in FIG. 4 showing the provision for installing four parachutes. There are three chambers for storing parachutes and one chamber for storing the inflatable air bag.
Figure 6:
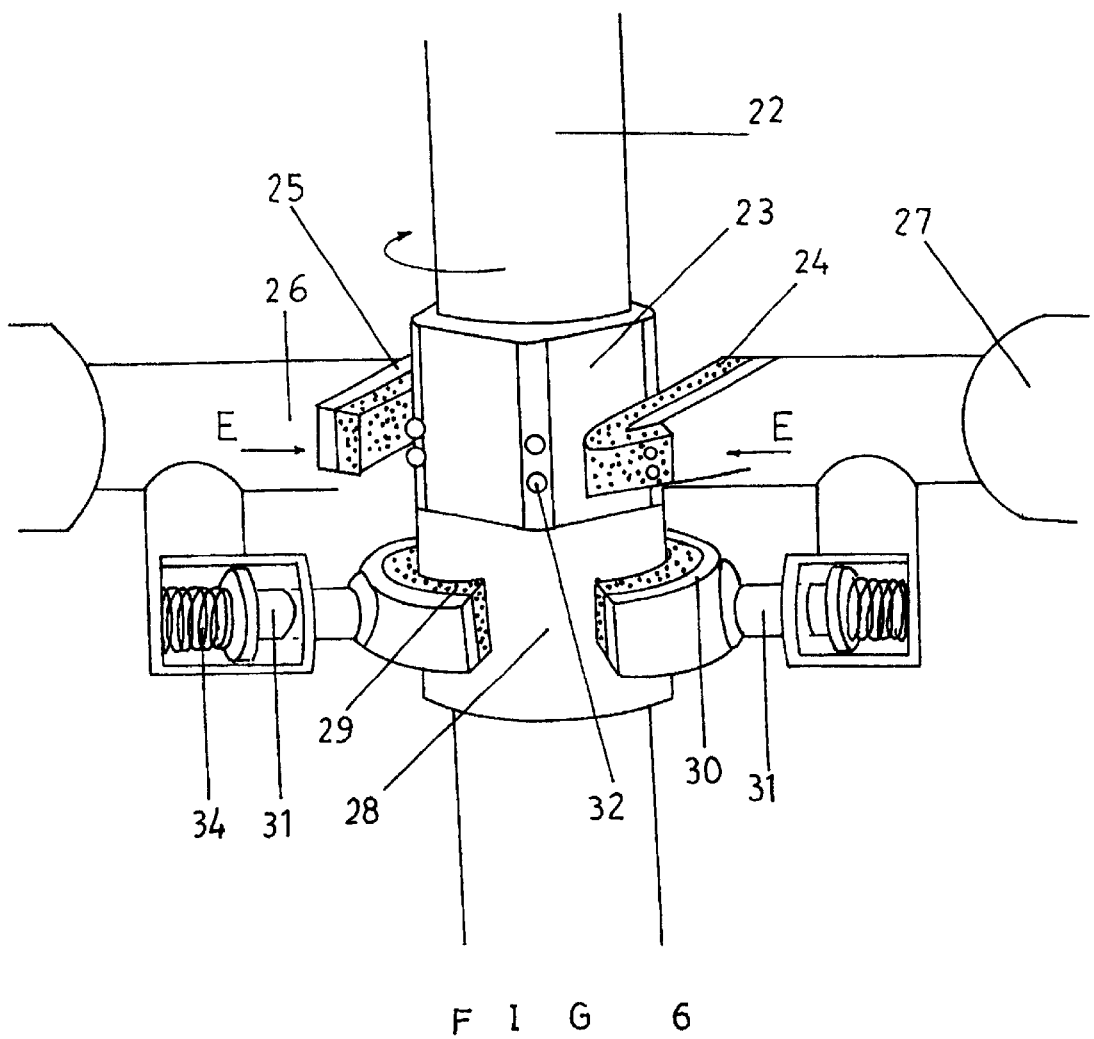
FIG. 6 is an isolated partial sectional elevation view of the braking system design which is useable for ceasing the rotation of the propeller to facilitate the deployment of the parachutes. The four blades of the propeller must be held at predetermined positions when the brake is applied.
Figure 7:
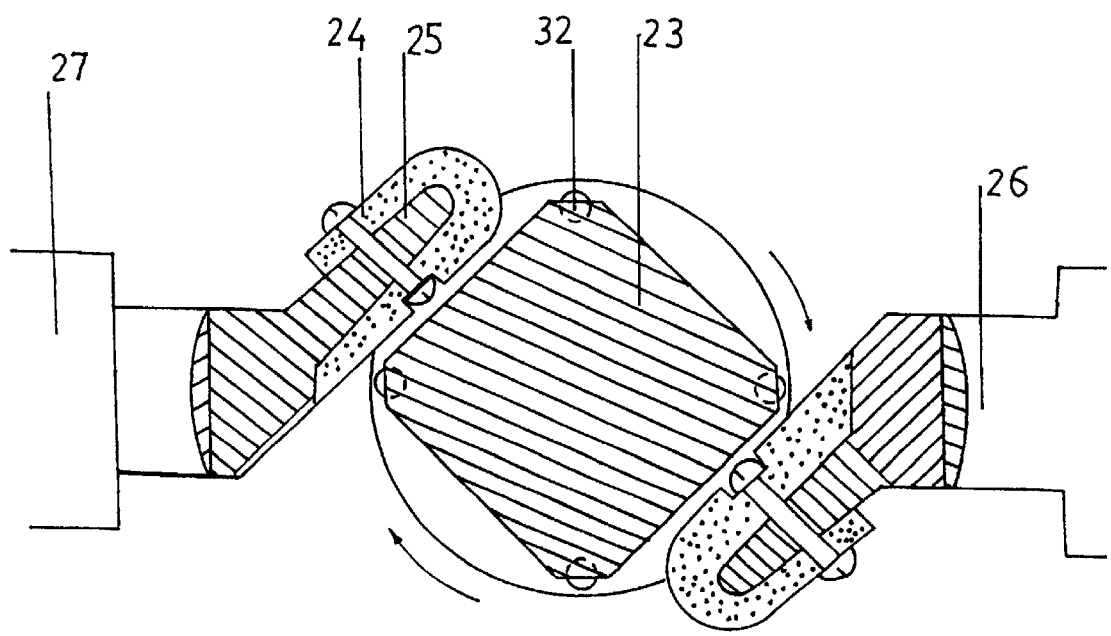
FIG. 7 is an isolated top sectional view along section line E—E in FIG. 6.
Figure 8:
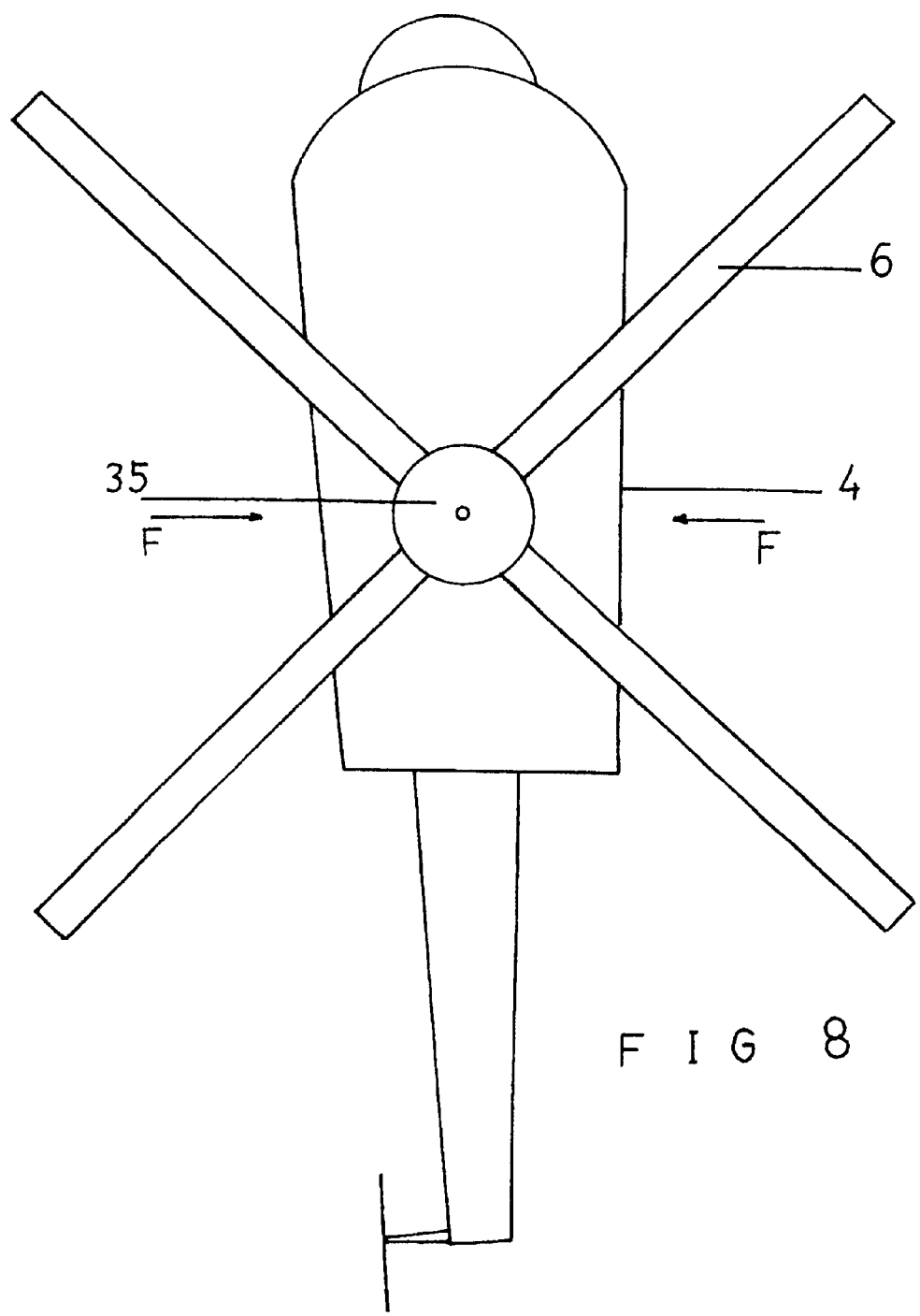
FIG. 8 is the top elevation view of the helicopter with the parachute provided at the propeller shaft.
Figure 9:
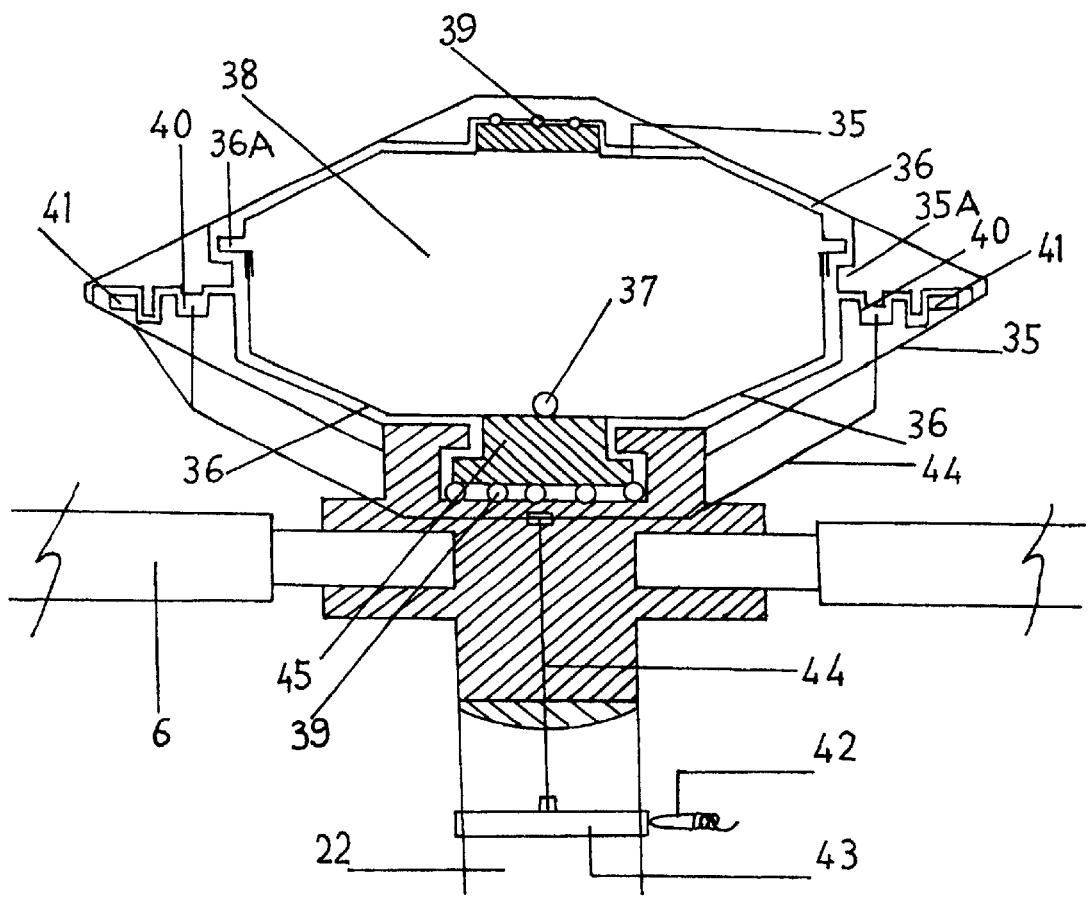
FIG. 9 is an isolated sectional view along section line F—F in FIG. 8.

Two pairs of auxiliary parachutes 20 and 21 are located on the left and right sides and front and back sides respectively on the top of the helicopter as best shown in FIG. 4 and they are positioned at the spaces between the locked blades of the propeller such that these auxiliary parachutes may be deployed safely. The propeller of the helicopter is driven by a drive shaft 22 which has an angular portion 23 adapted to engage with angular brake shoes 24 provided on a metal angular support 25 mounted to a sliding rod 26 of an ABS brake system. The sliding rod 26 is slidably mounted to a stationary mounting base 27. The drive shaft 22 also has a circular brake portion 28 adapted to engage with semi-circular brake shoes 29. The diameter of these brake shoes 29 are equal to that of the circular brake portion 28 of the drive shaft. The semi-circular brake shoes 29 are mounted on semi-circular metal arms portion 30 of a spring mounted rod 31. Steel rollers 32 are located between the angular portion 23 on the drive shaft 22; and the sliding rod 26 are fixed extensions which move with the sliding rod 26. The rod 31 is biassed by a high strength spring 34 for providing a soft braking action to reduce the rotation of the drive shaft. When the brake of the propeller is applied, the semi-circular brake shoes 29 will engage the circular brake portion 28 of the drive shaft 22 to cease the rotation of the propeller, and additionally the angular brake shoes 24 will engage with the angular brake portion 23 of the drive shaft 22 so that the propeller blades are always locked at the same predetermined angular positions. The unique braking system of the present invention as shown in FIG. 6 is operable after the power for rotating the propeller has terminated.

The main parachute may be installed in an external container 35 provided at the top of the drive shaft 22 and it is rotatable directly with the latter. The parachute is housed in an inner box 36 which has a circular top cover and a circular bottom base. The inner box 36 is protected by the external container 35. The parachute is mounted to the bottom base by a mounting ring 37 and it is located in a chamber 38 formed between the top cover and the bottom base of the inner box 36. Rollers 39 are provided between the external container 35 and the top cover and circular base of the inner box 36 such that the external container 35 may rotate relative to the inner box 36. Four explosive holding chambers 40 are provided between the top cover and the circular bottom base. The explosive in these chambers 40 may be detonated to force open the covers of the inner box and the external container. The cover of the external container 35 is normally locked in place with six spring loaded electromagnetic latches 41. When an accident occurs, the electromagnetic latches 41 are unlatched and simultaneously the explosive located in the four chambers 40 are detonated to force open the cover of the external container 35, and since the cover of the inner box 36 is connected to the cover of the external container, it will also be forced open. In this manner, the parachute which is connected to the mounting ring 37 is deployed. The electrical power for activating the electromagnetic latches 41 is conducted to the latches through a carbon rod 42 which is in contact with a rotatable copper ring 43 connected to electrical wiring 44 supplying the electrical power to energize the electromagnetic latches and to detonate the explosive in chambers 40. The detonation of the explosive causes an annular projection ring 35A to push upwards at a projecting circular flange 36A of the inner box cover. Thus in a chain action, the parachute located in the inner box is deployed instantly. The steel bottom base 45 of the inner box 36 is coupled to the drive shaft 22 but it is rotatable independently of the latter.

Figure 10:
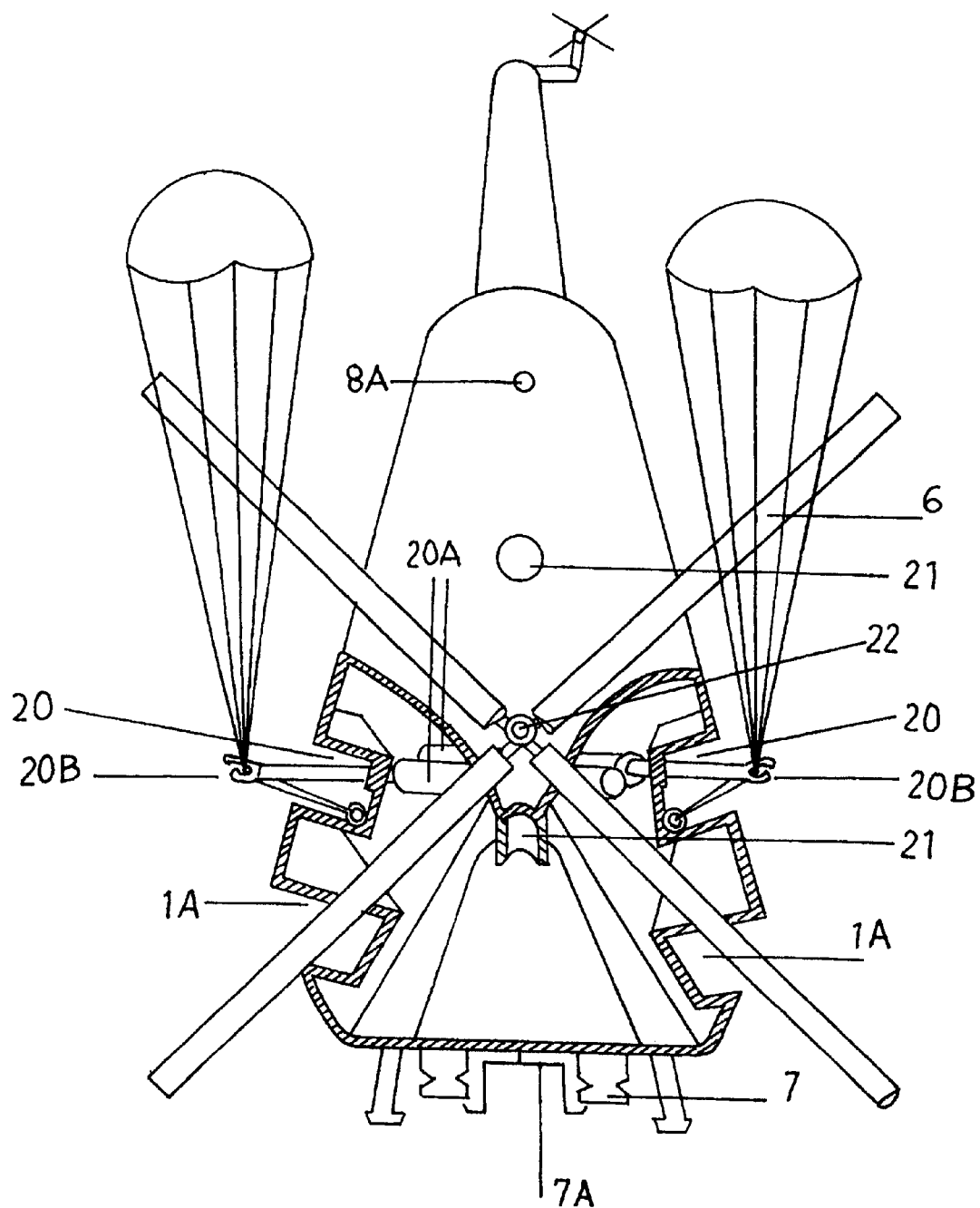
FIG. 10 is a top elevation view showing the deployment of the parachutes at the left and right sides of the helicopter with extension arms arrangements.

FIG. 10 shows an alternative embodiment for a helicopter in which its body is not wide enough to house the left and right auxiliary parachutes at its top. Two horizontally extensible pneumatic arms 20A having an extensible shaft 20B are provided. These pneumatic arms push the connecting cables of the auxiliary parachutes outwards so as to locate the deployed auxiliary parachutes housed at the two sides of the helicopter further outwards of the helicopter body.

What is claimed is:

1. A safety system for safely landing in an air accident a falling disabled helicopter normally impelled by a propeller, comprising at least one parachute mounted on said helicopter and adapted to deploy in the accident, speed reduction jets mounted at a belly portion of said helicopter and operative in cooperation with said parachute for reducing the falling of said helicopter to a safe landing speed, inflatable means mounted on left and right undersides of said helicopter and adapted to maintain said helicopter afloat when said helicopter falls on to water, and to cushion landing impact when said helicopter falls on to land, said propeller being mounted on a drive shaft made of a hollow steel tube having drive gears integrally provided thereon, a stationary hollow cylinder located in said drive shaft and adapted for housing a main parachute connected to said helicopter.

2. A safety system according to claim 1 wherein said hollow cylinder has a high pressure air inlet formed in a bottom panel therein, said air inlet being operative for providing a high pressure air for ejecting said parachute out of said hollow cylinder.

3. A safety system according to claim 2 including a connection ring located at said bottom panel of said hollow cylinder and said parachute being connected to said helicopter through said connection ring.

4. A safety system according to claim 1 wherein said drive shaft has a substantially rectangular angular portion operative in cooperation with a pair of angular brake shoes located adjacent to two opposite sides of said angular portion for stopping rotation of said drive shaft at a predetermined angular position, two spring mounted semi-circular brake shoes located adjacent to said drive shaft and operative to brake the rotational inertia of said drive shaft prior to actuation of said angular brake shoes, said angular brake shoes cooperating with said angular portion of said drive shaft for locking said drive shaft at said predetermined angular position instantly in said air accident, four auxiliary parachutes located on a top portion of said helicopter, said auxiliary parachutes being located in spaces between blades of said propeller when said drive shaft is locked in said predetermined angular position.

5. A safety system for safely landing in an air accident a falling disabled helicopter normally impelled by a propeller, comprising at least one parachute mounted on said helicopter and adapted to deploy in the accident, speed reduction jets mounted at a belly portion of said helicopter and operative in cooperation with said parachute for reducing the falling of said helicopter to a safe land speed, inflatable means mounted on left and right undersides of said helicopter and adapted to maintain said helicopter afloat when said helicopter falls on to a body of water, and to cushion impact when said helicopter falls on to land, said propeller being mounted on a drive shaft made of a hollow steel tube having drive gears integrally provided thereon, said drive shaft having a substantially rectangular angular portion operative in cooperation with a pair of angular brake shoes located adjacent to two opposite sides of said angular portion for stopping rotation of said drive shaft at a predetermined angular position, a plurality of rollers mounted at corners of said angular portion of said drive shaft.

6. A safety system for safely landing in an accident a falling disabled helicopter normally impelled by a propeller, comprising at least one parachute mounted on said helicopter and adapted to deploy in the accident, speed reduction jets mounted at a belly portion of said helicopter and operative in cooperation with said parachute for reducing the falling of said helicopter to a safe landing speed, inflatable air bags mounted on left and right undersides of said helicopter and adapted to maintain said helicopter afloat when said helicopter falls on to a body of water, and to cushion landing impact when said helicopter falls on to land, said propeller being mounted on a drive shaft made of a hollow steel tube having drive gears integrally provided thereon, a stationary hollow cylinder located in said drive shaft and adapted for housing a main parachute connected to said helicopter, an air tube located on the top portion of said helicopter and being operative to extend above water waves for venting fresh air into said helicopter when said helicopter falls on said body of water.

* * * * *